(12) United States Patent
Montuno et al.

(10) Patent No.: US 6,993,025 B1
(45) Date of Patent: Jan. 31, 2006

(54) METHOD AND APPARATUS FOR ENCODING A PLURALITY OF PRE-DEFINED CODES INTO A SEARCH KEY AND FOR LOCATING A LONGEST MATCHING PRE-DEFINED CODE

(75) Inventors: Delfin Y. Montuno, Kanata (CA); James Aweya, Nepean (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/475,308

(22) Filed: Dec. 30, 1999

(51) Int. Cl.
*H04L 12/28* (2006.01)

(52) U.S. Cl. ........................................ 370/392
(58) Field of Classification Search ......... 370/389–392, 370/400–402, 396, 395.32, 395.52; 707/1, 707/3, 5, 6, 7, 100, 102; 709/238, 1, 200–203, 709/247
See application file for complete search history.

(56) References Cited

U.S. PATENT DOCUMENTS

| | | | | |
|---|---|---|---|---|
| 5,781,772 | A | * | 7/1998 | Wilkinson et al. ............. 707/3 |
| 6,011,795 | A | * | 1/2000 | Varghese et al. ............ 370/392 |
| 6,018,524 | A | * | 1/2000 | Turner et al. ............... 370/392 |
| 6,067,574 | A | * | 5/2000 | Tzeng ......................... 709/247 |
| 6,212,184 | B1 | * | 4/2001 | Venkatachary et al. ..... 370/392 |
| 6,223,172 | B1 | * | 4/2001 | Hunter et al. ................... 707/3 |
| 6,266,706 | B1 | * | 7/2001 | Brodnik et al. ............. 709/242 |
| 6,526,055 | B1 | * | 2/2003 | Perlman et al. ............. 370/392 |
| 6,560,610 | B1 | * | 5/2003 | Eatherton et al. ........ 707/104.1 |
| 6,614,789 | B1 | * | 9/2003 | Yazdani et al. ............. 370/392 |

OTHER PUBLICATIONS

Srinivasan et al, Faster IP Lookups using Controlled Prefix Expansion, pp. 1–10, ACM, Jun. 1998.*

Eatherton, ASIC Based IPV4 Lookups, Washington University, Applied Research Laboratory, pp. 1–22, Jun. 23, 1998.*

(Continued)

*Primary Examiner*—Frank Duong

(57) ABSTRACT

A method of encoding a plurality of pre-defined codes into a search key and a method of using the search key to locate a longest matching pre-defined code to a given code is disclosed. Encoding the pre-defined codes into a search key involves producing a prefix node bit array (PNBA) having a plurality of bit positions corresponding to possible bit combinations of a bit string having a length equal to or less than the longest predefined code in said plurality of said pre-defined codes such that said bit positions are arranged by the lengths of said possible bit combinations and by numeric value of said possible bit combinations and to setting bits active in bit positions which correspond to bit combinations identified by said pre-defined codes. The method of locating involves producing a search mask encoding at least one portion of said given code and comparing said search mask to a search key having a Prefix Node Bit Array (PNBA) in which a bit is set active in at least one of a plurality of bit positions corresponding to possible bit combinations of bits in a bit string having a length equal to or less than the longest predefined code in said plurality of said pre-defined codes and arranged by the lengths of said possible bit combinations and by numeric values of said bit combinations, to identify a common active bit position in said search key and said search mask corresponding to a one of said pre-defined codes having a length greater than all others of said pre-defined codes which correspond to common active bit positions.

23 Claims, 14 Drawing Sheets

OTHER PUBLICATIONS

Eatherton, Hardware–Based Internet Protocol Prefixed Lookups, Thesis, Washington University, pp. 1–100, May 1999.*

Tzeng, Henry–Yi and Przygienda, Tony; "On Fast Address–Lookup Algorithms"; pp. 1067–1082, IEEE Journal On Selected Areas In Communications, vol. 17, No. 6, Jun. 1999.

Fuller, V.; T. Li; J. Yu and K. Varadhan, "Classless Inter–Domain Routing (CIDR): an Address Assignment and Aggregation Strategy", RFC 1519, Internet Engineetring Task Force, Sep. 1993.

Srinivasan, V.; Varghese, G.; "Fast Address Lookups Using Controlled Prefix Expansion", ACM Transactions on Computer Systems, vol. 17, No. 1, pp. 1–40, Feb. 1999.

Degermark, Mikael; Brodnik, Andrej; Carlsson, Svante; Pink, Stephen; "Small Forwarding Tables for Fast Routing Lookups", Proc. of ACM SIGCOMM, pp. 3–14, Sep. 1997.

Gupta, Pankaj: Steven Lin and Nick McKeown, "Routing Lookups in Hardware at Memory Access Speeds", IEEE INFOCOM, Apr. 1998.

Kumar, Vijay P.; T.V. Lakshman and Dimitrios Stiliadis, Beyond Best Effort: Router Architectures for the Differentiated Services of Tomorrow's Internet, IEEE Communication Magazine, pp. 152–164, May 1998.

Morrison, Donald R., "PATRICIA—Practical Algorithm To Retrieve Information Coded in Alphanumeric", Journal of the Association for Computing Machinery, pp. 514–534, vol. 15, No. 4, Oct. 1968.

Nilsson, Stefan and Gunnar Karlsson, "Fast Address Lookup for Internet Routers", IFIP Workshop on Broadband Communications, pp. 10–22, Apr. 1998.

Pei, Tong Bi and Charles Zukowksi, "Putting Routing Tables in Silicon", IEEE Network Magazine, pp. 42–50, Jan. 1992.

Tzeng, Henry Hong–Yi, "Longest Prefix Search Using Compressed Trees", Globecom '98, Sydney, Australia, Nov. 1998.

Waldvogel, Marcel; George Varghese; Jon Turner and Bernhard Plattner, "Scalable High Speed IP Routing Lookups", Proc. of ACM SIGCOM, Sep. 1997.

Zitterbart, M.; T. Harbaum; D. Meier; D. Brokelmann, "HeaRT: High Performance Routing Table Look Up", IEEE Workshop Architecture & Implementation of High Performance Communications Subsystems, Thessaloniki, Greece, Jun. 1997.

Lampson, B.; V. Srinivasan and G. Varghese, "IP Lookups Using Multiway and Multicolumn Search", pp. 1–23, Aug. 1997.

Doeringer, Willibald; Karjoth, Gunter; "Routing on Longest–Matching Prefixes", IEEE Trans. on Networking, vol. 4, No. 1, pp. 86–97, Feb. 1996.

Filippi, E.; Innocenti, V.; Vercellone, V.; "Address Lookup Solutions for Gigabit Switch/Router", Globecom '98, Sydney, Australia, Nov. 1998.

* cited by examiner

| ROW | LISTED PREFIX | PREFIX LENGTH | NEXT HOP INFO |
|---|---|---|---|
| 1 | 0 | 1 | $nh_1$ |
| 2 | 00 | 2 | $nh_2$ |
| 3 | 0010 | 4 | $nh_3$ |
| 4 | 01 | 2 | $nh_4$ |
| 5 | 010 | 3 | $nh_5$ |
| 6 | 011 | 3 | $nh_6$ |
| 7 | 1 | 1 | $nh_7$ |
| 8 | 11 | 2 | $nh_8$ |
| 9 | 1110 | 4 | $nh_9$ |
| 10 | 11111 | 5 | $nh_{10}$ |

FIGURE 3

| | | | | | | | | | | |
|---|---|---|---|---|---|---|---|---|---|---|
| 1) | 0 | - | - | - | - | 32) | 0 | 0 | 0 | 0 | 1 |
| 2) | 1 | - | - | - | - | 33) | 0 | 0 | 0 | 1 | 0 |
| 3) | 0 | 0 | - | - | - | 34) | 0 | 0 | 0 | 1 | 1 |
| 4) | 0 | 1 | - | - | - | 35) | 0 | 0 | 1 | 0 | 0 |
| 5) | 1 | 0 | - | - | - | 36) | 0 | 0 | 1 | 0 | 1 |
| 6) | 1 | 1 | - | - | - | 37) | 0 | 0 | 1 | 1 | 0 |
| 7) | 0 | 0 | 0 | - | - | 38) | 0 | 0 | 1 | 1 | 1 |
| 8) | 0 | 0 | 1 | - | - | 39) | 0 | 1 | 0 | 0 | 0 |
| 9) | 0 | 1 | 0 | - | - | 40) | 0 | 1 | 0 | 0 | 1 |
| 10) | 0 | 1 | 1 | - | - | 41) | 0 | 1 | 0 | 1 | 0 |
| 11) | 1 | 0 | 0 | - | - | 42) | 0 | 1 | 0 | 1 | 1 |
| 12) | 1 | 0 | 1 | - | - | 43) | 0 | 1 | 1 | 0 | 0 |
| 13) | 1 | 1 | 0 | - | - | 44) | 0 | 1 | 1 | 0 | 1 |
| 14) | 1 | 1 | 1 | - | - | 45) | 0 | 1 | 1 | 1 | 0 |
| 15) | 0 | 0 | 0 | 0 | - | 46) | 0 | 1 | 1 | 1 | 1 |
| 16) | 0 | 0 | 0 | 1 | - | 47) | 1 | 0 | 0 | 0 | 0 |
| 17) | 0 | 0 | 1 | 0 | - | 48) | 1 | 0 | 0 | 0 | 1 |
| 18) | 0 | 0 | 1 | 1 | - | 49) | 1 | 0 | 0 | 1 | 0 |
| 19) | 0 | 1 | 0 | 0 | - | 50) | 1 | 0 | 0 | 1 | 1 |
| 20) | 0 | 1 | 0 | 1 | - | 51) | 1 | 0 | 1 | 0 | 0 |
| 21) | 0 | 1 | 1 | 0 | - | 52) | 1 | 0 | 1 | 0 | 1 |
| 22) | 0 | 1 | 1 | 1 | - | 53) | 1 | 0 | 1 | 1 | 0 |
| 23) | 1 | 0 | 0 | 0 | - | 54) | 1 | 0 | 1 | 1 | 1 |
| 24) | 1 | 0 | 0 | 1 | - | 55) | 1 | 1 | 0 | 0 | 0 |
| 25) | 1 | 0 | 1 | 0 | - | 56) | 1 | 1 | 0 | 0 | 1 |
| 26) | 1 | 0 | 1 | 1 | - | 57) | 1 | 1 | 0 | 1 | 0 |
| 27) | 1 | 1 | 0 | 0 | - | 58) | 1 | 1 | 0 | 1 | 1 |
| 28) | 1 | 1 | 0 | 1 | - | 59) | 1 | 1 | 1 | 0 | 0 |
| 29) | 1 | 1 | 1 | 0 | - | 60) | 1 | 1 | 1 | 0 | 1 |
| 30) | 1 | 1 | 1 | 1 | - | 61) | 1 | 1 | 1 | 1 | 0 |
| 31) | 0 | 0 | 0 | 0 | 0 | 62) | 1 | 1 | 1 | 1 | 1 |

| Bit position | 1 | 2 | 3 | 4 | 5 | 6 | 7,8 | 9 | 10 | 11-16 | 17 | 18-28 | 29 | 30-61 | 62 |
|---|---|---|---|---|---|---|---|---|---|---|---|---|---|---|---|
| PNBA | 1 | 1 | 1 | 1 | 0 | 1 | 0 | 1 | 1 | 0 | 1 | 0 | 1 | 0 | 1 |

FIGURE 8 (66)

| Bit position | 1 | 2 | 3 | 4 | 5 | 6 | 7,8 | 9 | 10 | 11-13 | 14 | 15-16 | 17 | 18-28 | 29 | 30-59 | 60 | 61 | 62 |
|---|---|---|---|---|---|---|---|---|---|---|---|---|---|---|---|---|---|---|---|
| PNBA | 0 | 1 | 0 | 0 | 0 | 1 | 0 | 0 | 0 | 0 | 1 | 0 | 0 | 0 | 1 | 0 | 1 | 0 | 0 |

FIGURE 9 (68)

| Bit position | 1 | 2 | 3 | 4 | 5 | 6 | 7,8 | 9 | 10 | 11-13 | 14 | 15-16 | 17 | 18-28 | 29 | 30-59 | 60 | 61 | 62 |
|---|---|---|---|---|---|---|---|---|---|---|---|---|---|---|---|---|---|---|---|
| PNBA | 0 | 1 | 0 | 0 | 0 | 1 | 0 | 0 | 0 | 0 | 0 | 0 | 0 | 0 | 1 | 0 | 0 | 0 | 0 |

| Row i | Listed Prefix | Decimal Value of Prefix String | Prefix Length $\|S\|$ | Next Hop Info | PNBA bit Position $b_i$ |
|---|---|---|---|---|---|
| 1 | 0 | 0 | 1 | $nh_1$ | 1 |
| 2 | 00 | 0 | 2 | $nh_2$ | 3 |
| 3 | 0010 | 2 | 4 | $nh_3$ | 17 |
| 4 | 01 | 1 | 2 | $nh_4$ | 4 |
| 5 | 010 | 2 | 3 | $nh_5$ | 9 |
| 6 | 011 | 3 | 3 | $nh_6$ | 10 |
| 7 | 1 | 1 | 1 | $nh_7$ | 2 |
| 8 | 11 | 3 | 2 | $nh_8$ | 6 |
| 9 | 1110 | 14 | 4 | $nh_9$ | 29 |
| 10 | 11111 | 31 | 5 | $nh_{10}$ | 62 |

FIGURE 6

| Position | Next Hop Info | Associated PNBA bit Position |
|---|---|---|
| 1 | $nh_1$ | 1 |
| 2 | $nh_7$ | 2 |
| 3 | $nh_2$ | 3 |
| 4 | $nh_4$ | 4 |
| 5 | $nh_8$ | 6 |
| 6 | $nh_5$ | 9 |
| 7 | $nh_6$ | 10 |
| 8 | $nh_3$ | 17 |
| 9 | $nh_9$ | 29 |
| 10 | $nh_{10}$ | 62 |

FIGURE 7

| Row i | Listed | Decimal Value of bit Prefix | Full Prefix Length | Prefix Length $|S|$ | Next Hop Info | PNBA bit Position $b_i$ | PNBA bit Value |
|---|---|---|---|---|---|---|---|
| 1 | 0 | 0 | 1 | 1 | $nh_1$ | 1 | 1 |
| 2 | 00 | 0 | 2 | 2 | $nh_2$ | 3 | 1 |
| 3 | 0010 | 0 | 4 | 2 | $nh_3$ | 3 | 0 |
| 4 | 01 | 1 | 2 | 2 | $nh_4$ | 4 | 1 |
| 5 | 010 | 1 | 3 | 2 | $nh_5$ | 4 | 0 |
| 6 | 011 | 1 | 3 | 2 | $nh_6$ | 4 | 0 |
| 7 | 1 | 1 | 1 | 1 | $nh_7$ | 2 | 1 |
| 8 | 11 | 3 | 2 | 2 | $nh_8$ | 6 | 1 |
| 9 | 1110 | 3 | 4 | 2 | $nh_9$ | 6 | 0 |
| 10 | 11111 | 3 | 5 | 2 | $nh_{10}$ | 6 | 0 |

| Position | Next Hop Info | First PNBA bit Position | Second PNBA bit Position | Third PNBA bit Position | Fourth PNBA bit Position | Fifth PNBA bit Position |
|---|---|---|---|---|---|---|
| 1 | $nh_1$ | 1 | - | - | - | - |
| 2 | $nh_7$ | 2 | - | - | - | - |
| 3 | $nh_2$ | 3 | - | - | - | - |
| 4 | $nh_4$ | 4 | - | - | - | - |
| 5 | $nh_8$ | 6 | - | - | - | - |
| 6 | $nh_3$ | - | 5 | - | - | - |
| 7 | $nh_5$ | - | - | 1 | - | - |
| 8 | $nh_6$ | - | - | 2 | - | - |
| 9 | $nh_9$ | - | - | - | 5 | - |
| 10 | $nh_{10}$ | - | - | - | - | 2 |

FIGURE 13

FIRST ESRBA — 76

| Bit Position | 1(00) | 2(01) | 3(10) | 4(11) |
|---|---|---|---|---|
| ESRBA | 1 | 1 | 0 | 1 |

FIGURE 15

FIRST PNBA MASK — 112

| Bit position | 1 | 2 | 3 | 4 | 5 | 6 |
|---|---|---|---|---|---|---|
| PNBA | 0 | 1 | 0 | 0 | 0 | 1 |

FIGURE 16

SECOND PNBA MASK — 114

| Bit position | 1 | 2 | 3 | 4 | 5 | 6 |
|---|---|---|---|---|---|---|
| PNBA | 0 | 1 | 0 | 0 | 1 | 0 |

FIGURE 17

THIRD PNBA MASK — 116

| Bit position | 1 | 2 | 3 | 4 | 5 | 6 |
|---|---|---|---|---|---|---|
| PNBA | 0 | 1 | 0 | 0 | 0 | 0 |

FIGURE 18

FIRST RESULTANT PNBA — 118

| Bit position | 1 | 2 | 3 | 4 | 5 | 6 |
|---|---|---|---|---|---|---|
| PNBA | 0 | 1 | 0 | 0 | 0 | 1 |

FIGURE 19

FIRST ESRBA MASK — 120

| Bit position | 1 | 2 | 3 | 4 |
|---|---|---|---|---|
| ESRBA | 0 | 0 | 0 | 1 |

FIGURE 20

SECOND ESRBA MASK — 122

| Bit position | 1 | 2 | 3 | 4 |
|---|---|---|---|---|
| ESRBA | 0 | 0 | 1 | 0 |

FIGURE 21

THIRD ESRBA MASK — 124

| Bit position | 1 | 2 | 3 | 4 |
|---|---|---|---|---|
| ESRBA | 0 | 0 | 0 | 0 |

FIGURE 22

FIRST RESULTANT ESRBA — 126

| Bit position | 1 | 2 | 3 | 4 |
|---|---|---|---|---|
| ESRBA | 0 | 0 | 0 | 1 |

FIGURE 23

SECOND RESULTANT PNBA — 128

| Bit position | 1 | 2 | 3 | 4 | 5 | 6 |
|---|---|---|---|---|---|---|
| PNBA | 0 | 0 | 0 | 0 | 1 | 0 |

FIGURE 24

SECOND RESULTANT ESRBA — 130

| Bit position | 1 | 2 | 3 | 4 |
|---|---|---|---|---|
| ESRBA | 0 | 0 | 0 | 0 |

FIGURE 25

METHOD AND APPARATUS FOR ENCODING A PLURALITY OF PRE-DEFINED CODES INTO A SEARCH KEY AND FOR LOCATING A LONGEST MATCHING PRE-DEFINED CODE

FIELD OF THE INVENTION

The present invention is directed to encoding a plurality of pre-defined codes into a search key and using the search key to locate a longest matching pre-defined code in response to a given code. More particularly, the invention is directed to encoding pre-defined codes into a search key where the pre-defined codes may be destination addresses for packet data, and using the search key to facilitate fast look up of routing or next hop information required to route a data packet to its destination address.

BACKGROUND OF THE INVENTION

The Internet is growing explosively. This explosive growth is reflected in both the number of devices using the Internet and the rate at which data packets are communicated between these devices.

When a sending device and a receiving device exchange a packet via the Internet, the packet generally passes through a number of network elements connected to the Internet between the sending device and the receiving device. A network element might include a switch, a router, or generally any network node. The packet is said to hop from one device to a next device in transit between the sending device and the receiving device via the Internet. Thus, a next device is often called a next hop.

Every device connected to the Internet is identified by a bit-sequence called an address. The number of Internet addresses is also growing explosively. In order to cope with this latter growth, the Internet Protocol (IP) supports multiple address encoding schemes, with the result that Internet address bit-sequences are not all the same length.

A sending device encodes within each packet an address corresponding to the receiving device, which is generally called a destination address. When a packet arrives at a network element, the network element examines the destination address encoded in the packet in order to select an appropriate next hop to forward the packet toward the receiving device. Generally, this next hop selection is made from among a relatively small number of devices that are proximate to the network element in the network.

Typically, the network element selects a next hop device using a routing table that correlates destination addresses to addresses or ports associated with the proximate devices. Usually, the routing table does not include a separate record for each destination address, but instead includes one record for each family of destination addresses, for example destination addresses sharing a common bit-sequence prefix. Thus in order to identify a correlated next hop device, the network element searches the routing table for the longest prefix that matches the destination address encoded in a packet being routed. However, efficiently searching the routing table for a longest matching prefix rather than a complete address can be complicated because there may exist several matching prefixes whereas only the longest matching prefix is being sought. Thus the search algorithm must locate a matching prefix and then determine that no longer matching prefix exists.

It will be appreciated that the explosive growth in both the number of potential destination addresses and the rate at which packets must be routed is placing significant demands on network elements. In fact, it is predicted that a new generation of network element will have to route millions of packets per second. Thus, the routing table lookup mechanism is critical to efficiently operating a network element and the Internet as a whole. Unfortunately, conventional routing table lookup mechanisms are insufficient for this task because they are too slow.

What is needed therefore is a way to encode pre-defined codes such as address-prefix bit-sequences and a way to locate a longest matching pre-defined code to a given code.

SUMMARY OF THE INVENTION

The present invention addresses the above needs by providing a method and apparatus for encoding a plurality of pre-defined codes into a search key and a method and apparatus for locating, in a list of pre-defined codes, a longest code matching a given code.

The method and apparatus for encoding involves using a processor circuit to produce a Prefix Node Bit Array (PNBA) having a plurality of bit positions corresponding to possible bit combinations of a bit string having a length equal to or less than the longest predefined code in the plurality of the pre-defined codes such that the bit positions are arranged by the lengths of the possible bit combinations and by numeric value of the possible bit combinations and to set bits active in bit positions which correspond to bit combinations identified by the pre-defined codes.

As the pre-defined codes are mapped into corresponding bit positions of the PNBA, a single bit can be used to represent the presence or absence of a possible bit combination. Consequently, the memory required to store the pre-defined codes, for look up purposes, is reduced.

Preferably, the method and apparatus also involve producing a next hop array associating bit positions of the PNBA which have active bits with muting information for use by a router to route a packet. Thus, the pre-defined codes are associated with respective bit positions in the PNBA and the respective bit positions in the PNBA are associated wit respective next hop information associated with the pre-defined codes.

In one embodiment, a plurality of PNBAs may be used to encode a plurality of subgroups of bits of the pre-defined codes. The use of a plurality of PNBAs may also involve producing an External Subtree Route Bit Array, having bit positions corresponding to possible further subgroups of bits of the pre-defined codes. In one embodiment, a single PNBA may be used to encode the plurality of pre-defined codes. Alternatively, in another embodiment, a plurality of PNBAs may be used, with associated External Subtree Route Bit Arrays (ESRBAs) as PNBA-ESRBA pairs in a single page of information, or as PNBA-ESRBA pairs on respective pages of information. Each page may include a next page pointer, pointing to a next page in a plurality of respective pages to be searched after considering a given page in a search.

The method described above facilitates locating a longest code matching a given code, in the list of pre-defined codes. This has particular use in routing packets in a computer network, for example, wherein the method can be used to locate routing information or next hop information based upon a destination address of a packet. If a destination address of the packet is considered to be a given code and destination prefixes are considered to be a list of pre-defined codes, the apparatus provides a method of locating in a list of pre-defined codes a longest code matching a given code.

The method involves producing a search mask encoding at least one portion of the given code, and comparing the search mask to a search key having a Prefix Node Bit Array (PNBA). In the PNBA, a bit is set active in at least one of a plurality of bit positions corresponding to bit combinations of bits in a bit string having a length equal to or less than the longest predefined code in the plurality of the pre-defined codes and arranged by the lengths of the bit combinations and by numeric values of the bit combinations. The purpose of comparing is to identify a common active bit position in the search key and the search mask corresponding to a one of the pre-defined codes having a length greater than all others of the pre-defined codes which correspond to common active bit positions.

Effectively, the need to compare bits of the given code with bits of pre-defined codes in the list of such codes is eliminated by use of the search mask and the search key.

If the search key includes a single prefix node bit array, then the search mask is produced to include a single prefix node bit array mask of the same length, for comparison with the prefix node bit array. This may be done by logically ANDing the PNBA mask with a search PNBA of the search key to produce a resultant PNBA. A highest bit position in the resultant PNBA identifies a longest code of the pre-defined codes which is the longest code matching the resultant PNBA.

When the method is used to locate next hop information for a packet having a destination address which acts as the given code, the next hop information can be located by finding the information associated with the highest ordered bit position, which is set active in the resultant PNBA.

Alternatively, a plurality of PNBA masks may be produced to encode possible bit subcombinations of the given code. These PNBA masks can be used with a plurality of PNBAs to consider subcombinations or subprefixes of the given code and the predefined codes to reduce the amount of memory to encode the predefined codes. In such an embodiment, a PNBA mask representing a first k bits of the given code is compared with a first PNBA encoding a first k bits of the pre-defined codes to determine a potential longest matching subprefix.

An External Subtree Route Bit Array (ESRBA) associated with the first PNBA is then compared with a first ESRBA mask derived from the given code to determine whether or not further searching of a further PNBA is required. If not, then in the case where the given code is a destination address for example, the result of the comparison between the first PNBA and the first PNBA mask can be used to determine next hop information. Alternatively, if further searching is to be performed, then a second PNBA is compared with a second PNBA mask to produce a further potential longest matching code and a second ESRBA and a second ESRBA mask are compared to determine whether or not further searching is required. This process is continued until no further searching is required, in which case the last determined longest matching code is taken as the actual longest matching code.

The PNBAs and ESRBAs of the multiple PNBA embodiment may be stored in a plurality of pages comprising a plurality of PNBA-ESRBA pairs on a few pages or single PNBA-ESRBA pairs on respective pages.

The use of multiple pages requires a larger number of memory unit accesses, but requires less memory, whereas the fewer number of pages requires fewer accesses, but more memory unit space for storage. Consequently, trade offs between memory availability and memory accesses can be made.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention,

FIG. 3 is a tabular representation of a sorted list of routing records received by the network element of FIG. 1 and stored in RAM at the network element;

FIG. 4 is a tabular representation of the 62 possible address prefixes for listing prefixes having 5 bits or less;

FIG. 5 is a tabular representation of a Prefix Node Bit Array (PNBA) generated by the processor circuit from the sorted list of prefixes shown in FIG. 3;

FIG. 6 is a tabular representation of the list shown in FIG. 3 with PNBA bit positions associated with corresponding listed prefixes and decimal values of corresponding listed prefixes;

FIG. 7 is a tabular representation of a next hop array produced by showing next hop information associated with PNBA bit positions;

FIG. 8 is a tabular representation of a PNBA mask produced from a destination address in a received data packet;

FIG. 9 is a tabular representation of a resultant PNBA produced by ANDing the PNBA of FIG. 5 with the PNBA mask of FIG. 8;

FIG. 10 is a tabular representation of the sorted list of FIG. 3 with associated PNBA bit positions and PNBA bit values produced according to second and third embodiments of the invention;

FIG. 13 is a tabular representation of a next hop array produced in accordance with the second and third embodiments of the invention;

FIG. 15 is a tabular representation of a first External Subtree Root bit Array (ESRBA) produced according to the second and third embodiments of the invention;

FIG. 16 is a tabular representation of a first PNBA mask produced according to the second and third embodiments of the invention;

FIG. 17 is a tabular representation of a second PNBA mask according to the second and third embodiments of the invention;

FIG. 18 is a tabular representation of a third PNBA mask produced according to the second and third embodiments of the invention;

FIG. 19 is a tabular representation of a first resultant PNBA according to the second and third embodiments of the invention;

FIG. 20 is a tabular representation of a first ESRBA mask produced according to the second and third embodiments of the invention.

FIG. 21 is a tabular representation of a second ESRBA mask produced according to the second and third embodiments of the invention;

FIG. 22 is a tabular representation of a third ESRBA mask produced according to the second and third embodiments of the invention;

FIG. 23 is a tabular representation of a first resultant ESRBA produced according to the second and third embodiments of the invention;

FIG. 24 is a tabular representation of a second resultant PNBA produced according to the second and third embodiments of the invention;

FIG. 25 is a tabular representation of a second resultant ESRBA produced according to the second and third embodiments of the invention.

DETAILED DESCRIPTION

Figure 1:
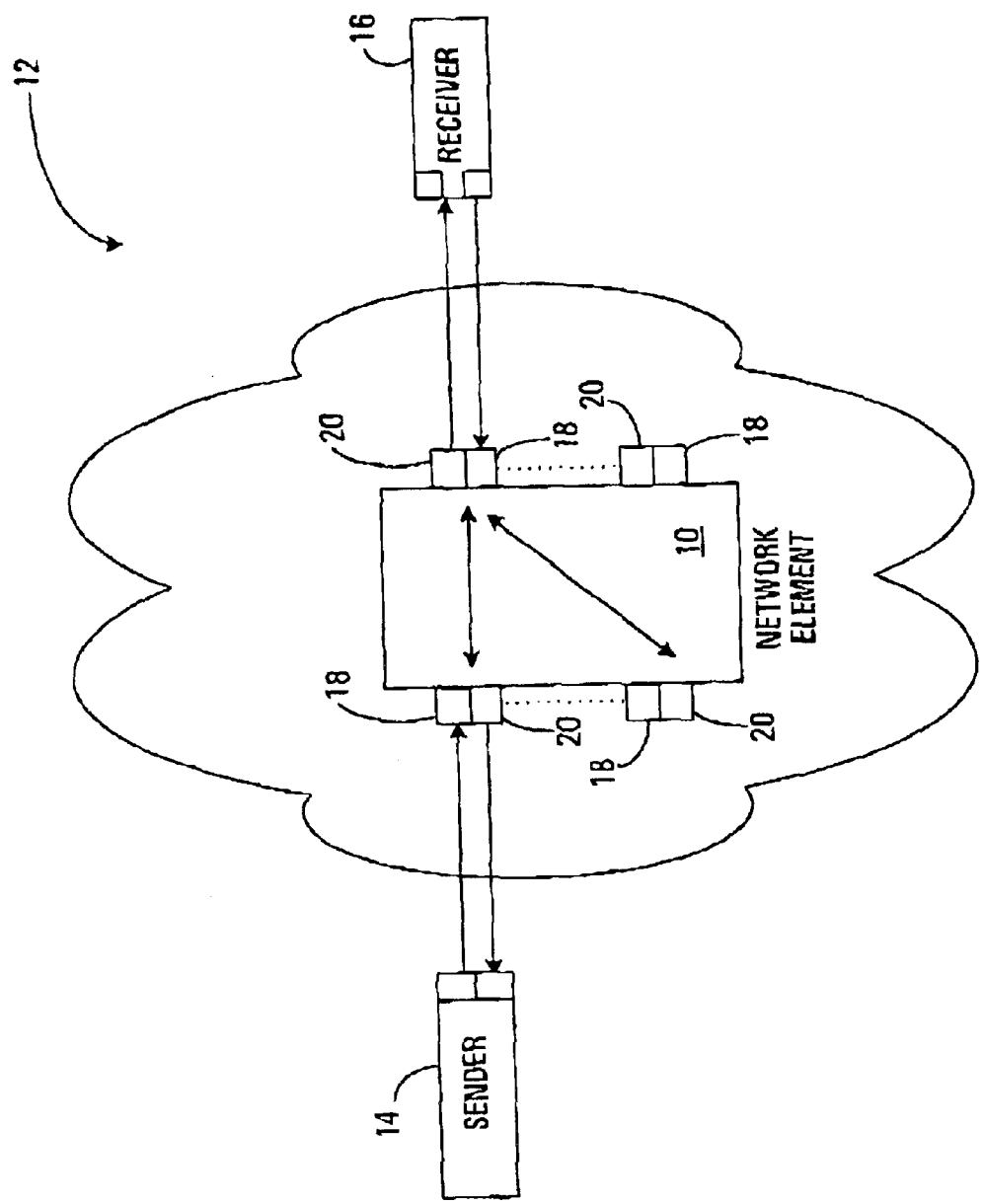
FIG. 1 is a block diagram of network element according to a first embodiment of the present invention.

Referring to FIG. 1, a network employing a network element or network node 10, according to a first embodiment of the invention is shown generally at 12. In this embodiment, the network 12 is a packet network, such as an internet or intranet, for example. The network element may be a router, or a switch, for example, and generally acts to forward packets received from a packet network to other network elements en route to a destination device identified by a destination address in a packet header of the packet.

The network element 10 has a plurality of input ports 18 and a plurality of output ports 20 for receiving and transmitting signals respectively on the network 12. There may be a plurality of network elements 10 on the network 12, each network element representing a "hop" in a path from the sender of a packet to a receiver of the packet.

Figure 2:
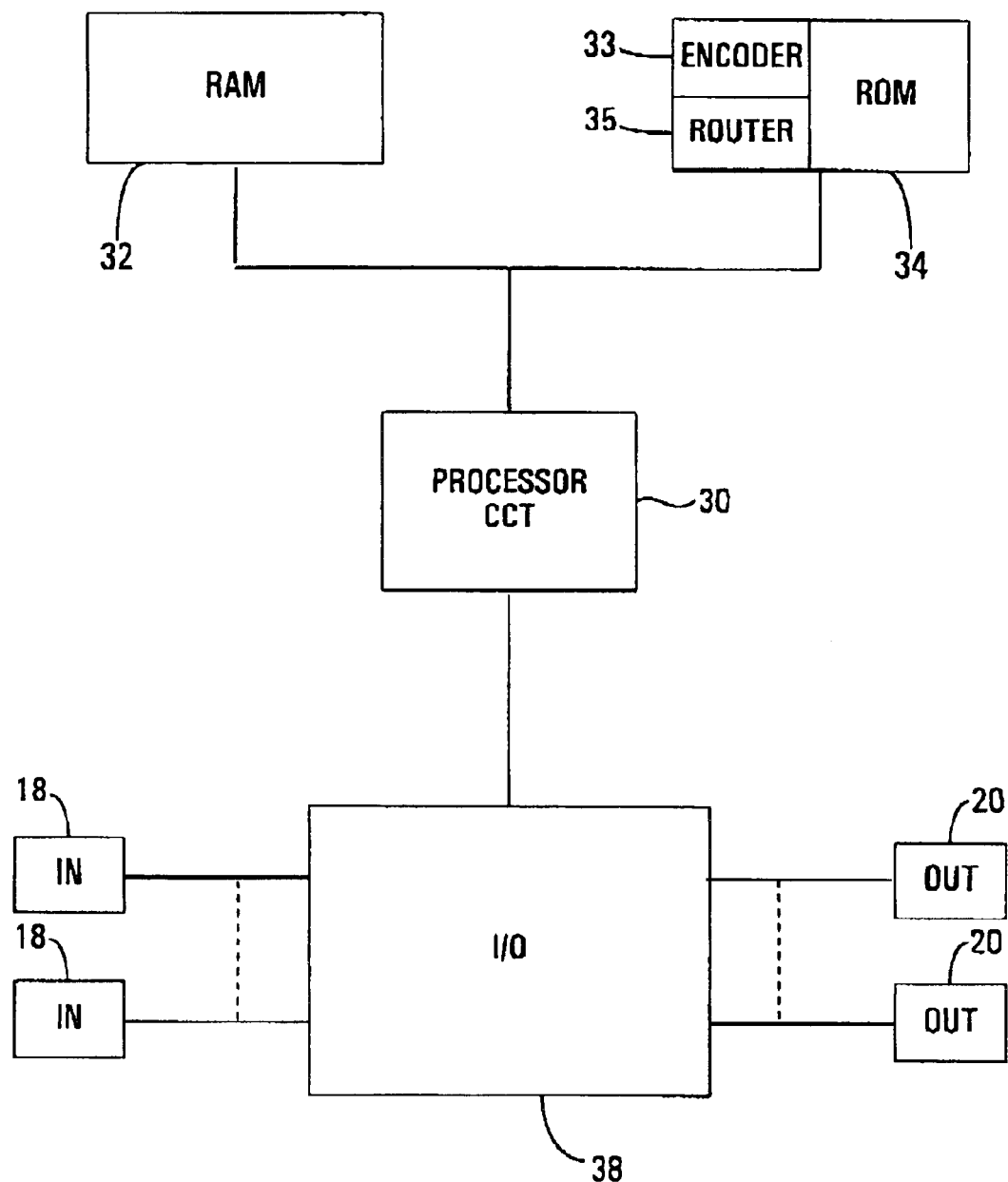
FIG. 2 is a block diagram illustrating an architecture of the network element of FIG. 1.

Referring to FIG. 2, the network element 10 is illustrated in greater detail. Essentially, the network element encodes and associates a plurality of pre-defined address prefixes with a plurality of corresponding output ports 20 in such a manner that when a packet is received at the network element 10, the packet is routed to an output port associated with the longest pre-defined address prefix matching a destination address encoded in the packet. In the present embodiment, the network 12 may be an Internet Protocol (IPv4) network and accordingly, the destination address encoded in the packet is 32-bits long. However, for the purposes of explanation a 5-bit destination address will be used herein.

To route a packet from an input port 18 to an output port 20 in the manner described above, the network element 10 includes a processor circuit 30 in communication with a random access memory (RAM) 32 and a read only memory (ROM) 34. The processor circuit 30 is also in communication with an input/output (I/O) interface 38, which is connected to receive packets from the input ports 18 and to transmit packets to appropriate output ports 20 in response to directions provided by the processor circuit 30 in accordance with the present invention.

To achieve this, the ROM 34 is programmed with codes for directing the processor circuit 30 to perform certain functionality, including both conventional functionality of a network element 10 and the novel functionality of the present invention. The ROM 34 may be programmed with codes downloaded via the network 12 from a remote computer (not shown), or may have a media interface (not shown) for reading codes from a computer readable medium such as a CD-ROM, diskette or any other computer readable medium accessible by the processor circuit 30. In general, at least one set of codes programmed into the ROM configure the processor circuit to encode a plurality of predefined codes into a search key by producing a Prefix Node Bit Array (PNBA) having a plurality of bit positions corresponding to possible bit combinations of a bit string having a length equal to or less than the longest predefined code in the plurality of the pre-defined codes such that the bit positions are arranged by the lengths of the possible bit combinations and by numeric value of the bit combinations, and by setting active bits in bit positions which correspond to bit combinations identified by the pre-defined codes.

Another set of codes programmed into the ROM configures the processor circuit to locate, in a list of pre-defined codes, a longest code matching a given code by producing a search mask encoding at least one portion of the given code and comparing the search mask to a search key having a Prefix Node Bit Array (PNBA) in which a bit is set active in at least one of a plurality of bit positions corresponding to possible bit combinations of bits in a bit string having a length equal to or less than the longest predefined code in the plurality of the pre-defined codes and arranged by the lengths of the possible bit combinations and by numeric values of the bit combinations, to identify a common active bit position in the search key and the search mask corresponding to a one of the pre-defined codes having a length greater than all others of the pre-defined codes which correspond to common active bit positions.

More particularly, in accordance with the first embodiment of the invention, the codes programmed into the ROM include a first segment of codes 33 for directing the processor circuit to act as an encoder to encode the pre-defined address prefixes for facilitating fast identification of an output port to which an incoming packet is to be routed and a second segment of codes 35 for directing the processor circuit 30 to act as a router by using the encoded pre-defined address prefixes to identify an output port to which an incoming packet is to be routed.

The pre-defined address prefixes which are to be encoded by the processor circuit 30 are provided by a routing authority such as an owner of the network 12 or network element 10 to identify corresponding output ports 20 of the network node which are to receive packets bearing certain address prefixes. For example, the network authority may specify that packets having the single binary value "0" as the longest matching portion of their destination address with a pre-defined address prefix are to be routed to port number one. In general, the network authority provides to the network element 10 a list of pre-defined address prefixes referred to hereafter as listed prefixes, together with associated next hop port information, such as an identification of the output port to which a packet is to be routed when at least a prefix of its destination address matches one of the listed prefixes. Preferably, the listed prefixes are pre-sorted by length and bit position entries, in ascending order, into a sorted list or table 40 of routing records 42 as shown in FIG. 3.

Each routing record 42 includes three fields, namely a prefix field 44, a length field 46, and a next-hop field 48. The prefix field 44 holds codes representing a listed prefix for which next hop information exists. The length field 46 holds codes representing the string length of the listed prefix represented in the prefix field 44. The next-hop field 48 holds codes representing the next hop information, in particular, codes identifying one of the output ports 20 to which a packet received at an input port 18 should be directed when the associated listed prefix is the longest listed prefix matching at least a portion of a destination address encoded in a received packet.

In this embodiment, the routing records 42 have been presorted in the sorted list 40, first according to the binary value of the prefix strings stored in the prefix field 44 and second according to the string lengths stored in the length field 46.

Encoding According to the First Embodiment

The processor circuit 30 shown in FIG. 2 ultimately encodes a search key using the listed prefixes shown in FIG. 3 and produces a next hop array associating bit positions of the search key with next hop information to facilitate fast location of the identity of the output port to which an incoming packet is to be routed.

In this embodiment, generally, the search key includes a Prefix Node Bit Array (PNBA) having bit positions associated with respective listed prefixes. In the general case, all possible address prefixes have corresponding bit positions in the PNBA. Consequently, the size of the PNBA depends upon the maximum length of the listed prefixes. In general, the PNBA has $2^{n+1}-2$ bit positions.

In the listed prefixes shown in FIG. 3, the longest listed prefix is seen on Row 10 of the list and has a length of 5 bits. From the general relationship provided above, there are 62 possible address prefixes or bit combinations of bit strings having a length equal to or less than the longest address prefix or pre-defined code and each of these is shown adjacent its corresponding bit position in FIG. 4. FIG. 4 also shows that the bit positions of the PNBA are arranged in order by ascending lengths of possible bit combinations and by ascending numeric value of corresponding possible bit combinations. In FIG. 4, the listed prefixes provided in the sorted list shown in FIG. 3 are highlighted in bold type. In FIG. 5, a PNBA for these listed prefixes is shown at 49 and it can be seen that bits in bit positions 1,2,3,4,6,9,10,17,29 and 62 are set active as there are corresponding listed prefixes in the prefix table shown in FIG. 3.

In general, referring to FIG. 6, for the $i^{th}$ routing record, a bit in a corresponding bit position $b_i$ of the PNBA is set active, according to the following expression:

$$b_i = \left(\sum_{\omega=1}^{|S|} 2^{\omega-1}\right) + value(S), \tag{1}$$

where i=index number identifying the $i^{th}$ routing record;

$b_i$=bit position of the PNBA corresponding to the $i^{th}$ routing record, in which the bit is set active

|S|=length of the prefix string as indicated in the prefix length field 46 of the $i^{th}$ routing record; and value(S)=decimal value of the listed prefix represented in the prefix field 44 of the $i^{th}$ routing record.

After determining which bit positions of the PNBA are to be set to one, indicators of these bit positions may be added to PNBA bit position fields 50 associated with respective listed prefixes of the listed prefix table, to produce an enhanced listed prefix table 52 as shown in FIG. 6. This table has all of the columns of the table 40 shown in FIG. 3 and has further columns for PNBA bit position fields 50 and decimal values of prefix string fields 54.

After producing the enhanced listed prefix table shown in FIG. 6, the next hop information associated with the records therein is sorted according to the associated PNBA bit position indicated in the PNBA bit position field 50 of each record, to produce a next hop array 70 as shown in FIG. 7 having next hop records such as record 60 with next hop information fields 62 and associated PNBA bit position fields 64. Thus, the processor circuit is configured to produce a next hop array associating bit positions of the PNBA which have active bits with routing information for use by a router to route a packet.

Locating and Routing According to the First Embodiment

The router code segment executed by the processor circuit uses the PNBA shown in FIG. 5 to determine a position in the next hop array 70 shown in FIG. 7 to locate the appropriate next hop information in response to a destination address in a packet received at the network element 10.

In this embodiment, the router code segment directs the processor circuit 30 to use the destination address of a received packet to determine a longest matching listed prefix, to find the PNBA bit position of the longest matching prefix and to find the next hop information from the next hop array 70 using this PNBA bit position.

More particularly, determining a longest matching listed prefix is achieved by first producing a PNBA mask encoding at least a portion of the destination address or more generally, at least a portion of a given code, by applying a procedure similar to that used to generate the PNBA to the destination address in the received packet. In particular, using the expression:

$$j = \sum_{\omega=1}^{|S_i|} 2^{\omega-1} + value(S_i), \tag{2}$$

where $S_i$=one of the prefix substrings of the destination address or given code $|S_i|$=the length of $S_i$ value($S_i$)=the decimal value of $S_i$ Since the PNBA was produced using k=5 a PNBA mask having $2^{k+1}-2=62$ bit positions is produced with bits in bit positions being set according to the above expression. For example, if the destination address is 11101, a PNBA mask as shown at 66 in FIG. 8 is produced, in which bit positions 2, 6, 14, 29 and 60 are set active.

The PNBA mask 66 shown in FIG. 8 is then ANDed with the PNBA 49 shown in FIG. 5, in which bit positions 1,2,3,4,6,9,10,17,29 and 62 are set active, to produce a resultant PNBA as shown at 68 in FIG. 9 in which bit positions 2,6 and 29 are set active. Bit position 29 represents the longest matching listed prefix: 1110. It no such bit position exists, that is, the resultant PNBA is zero, then there is no next hop information in the next hop array 70 shown in FIG. 7 and the packet is routed to a default next hop port.

In this example, the resultant PNBA 68 is non-zero, therefore the position in the next hop array 70 at which the corresponding next hop information is stored is given by the following expression:

$$\sum_{l=1}^{n-1} PNBA(i) + value(\text{next hop in the pointers array}), \quad (3)$$

where

PNBA(i)=0 for i<1.

Using bit position 29 determined above, the relation produces the following:

$$\sum_{l=1}^{29-1} PNBA(i) = 8; \text{ and}$$

value (next hop in the pointers array)=1

8+1=9

Consequently, the ninth position in the next hop array holds the appropriate next hop information. The processor circuit is then directed to forward the packet to the output port associated with the information stored in the ninth position of the next hop array 70.

Encoding According to a Second Embodiment

It will be appreciated that FIG. 5 indicates that many of the bit positions in the PNBA of the first embodiment have a zero, and therefore only a relatively small number of PNBA bit positions are active. In other words, only a small number of the possible address prefixes are used. Referring to FIG. 10, a prefix table is shown at 71 in which the table of FIG. 3 is repeated with further columns for a decimal value of a bit prefix field 73, a decimal value of sub-prefix length field 75, a PNBA bit position field 77 and a PNBA bit value field 79. If a box 81 is drawn around the first two bits of each listed prefix it can be seen that all but five of the listed prefixes are fully defined by the bits within the box. These bits may be regarded as sub-prefixes of the listed prefixes. A second embodiment of the invention involves producing a search key by encoding sub-prefixes of the listed prefixes or more generally sub groups of bits of the pre-defined codes in a plurality of smaller PNBAs to reduce the amount of memory required to store the search key.

Figures 11, 12:
FIG. 11 is a tabular representation of the 6 possible address prefixes for listing sub-prefixes having 2 or less bits according to the second and third embodiments of the invention.
FIG. 12 is a tabular representation of a first PNBA produced in accordance with the second and third embodiments of the invention.

In this second embodiment the sub-prefixes shown within the box 81 are mapped to their own sub-prefix PNBA using the method described in connection with the first embodiment of the invention. In this example the box separates a plurality of two or less bit sub-prefixes which map into a first PNBA having six possible address sub-prefixes which are shown in FIG. 11. The size of the first PNBA in this embodiment depends on the number of bits k used as a sub-prefix. In this embodiment k=2. In general, in this embodiment, the first PNBA has $(2^{k+1}-2)$ bit positions. The sub-prefixes found in FIG. 10 correspond to bit positions 1,2,3,4, and 6 as shown in FIG. 11. Consequently, bits in these bit positions are set to one in the first PNBA 83 while all remaining bit positions, in this case only bit position 5, are set to zero, as shown in FIG. 12.

In general, the bits in a PNBA are set according to the expression:

$$j = \sum_{\omega=1}^{|S_k|} 2^{\omega-1} + value(S_k), \quad (4)$$

where:

$|S_k|$ is the length of the $i^{th}$ sub-prefix; and $S_k$ is the last portion of the $i^{th}$ prefix, value($S_k$)=the decimal value of the k-bit or less $i^{th}$ sub-prefix.

After determining which bit positions of the first PNBA 69 are to be loaded with a one, indicators of these bit positions may be inserted into PNBA bit position fields 77, in respective records associated with respective listed prefixes in the listed prefix table as shown in FIG. 10. In addition, the associated PNBA bit value stored in each bit position may be added to the PNBA bit value fields 79 of the corresponding records shown in FIG. 10 to indicate which of the records are to be used to produce the next hop array. Then, the next hop information associated with records having a PNBA bit value of one in their respective PNBA bit value field are ordered according to the associated first PNBA bit position to produce a next hop array 72 up to a first PNBA bit position field column 85 as shown in FIG. 13, wherein the position of next hop information in the next hop array is determined by the contents of the associated first PNBA bit position fields 77 of the indicated records in the table shown in FIG. 10.

Figure 14:
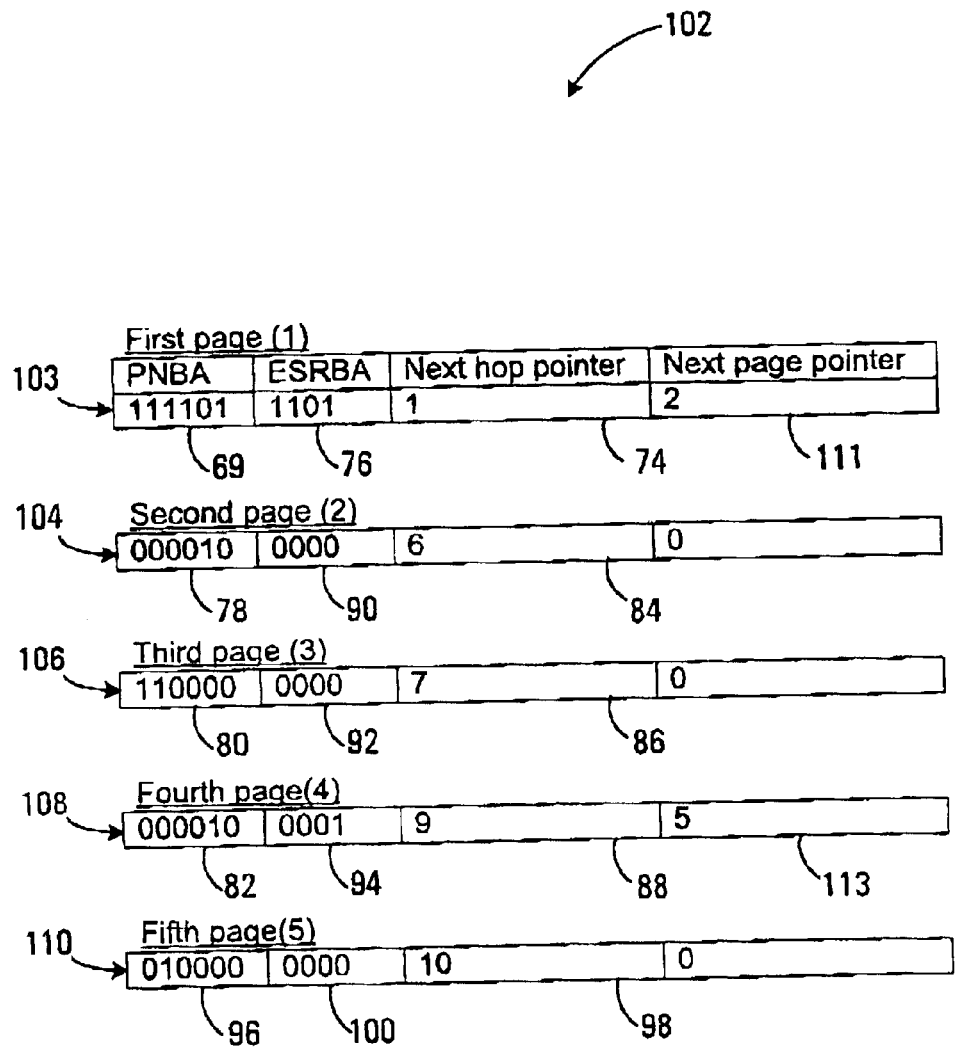
FIG. 14 is a tabular representation of a search key produced according to the second embodiment of the invention.

As shown in FIG. 14, a next hop pointer 74 is associated with the first PNBA 69 to indicate a position in the next hop array 72 at which the next hop information for the first listed sub-prefix encoded by the first PNBA 69 is located.

Since some of the sub-prefixes are part of listed prefixes which are longer than two bits, it is necessary to use another code, herein referred to as an External Subtree Root Bit Array (ESRBA) to identify those sub-prefixes which are part of a longer, listed prefix. In general the ESRBA has $2^k$ bit positions, corresponding to the possible bit combinations of k bits. In the example given, with k=2, there are 4 possible bit combinations and therefore as shown in FIG. 15, a first ESRBA 76 has 4 bit positions representing the bit combinations 00,01,10 and 11 respectively.

As shown in FIG. 10, 00 is a sub-prefix of the third listed prefix 0010 and therefore the first bit position of the first ESRBA is set to one. Similarly, 01 is a sub-prefix of 010 and 011 and therefore the second bit position of the first ESRBA is set to one. The sub-prefix 10 is not found in the first k bits of the records in the table shown in FIG. 10 and therefore the third bit position of the first ESRBA is set to 0. Finally, the sub-prefix 11 is shown in the table and therefore the fourth ESRBA bit position is set to one. The first ESRBA 76 thus has the value 1101, as shown in FIGS. 14 and 15.

Under each sub-prefix, there may be further combinations of k or less bits and therefore a separate PNBA is produced to encode the possible k bit sequences after each sub-prefix having a length longer than k. In the example shown, the sub-prefixes which have a length longer than 2 are on rows 3,5,6,9 and 10 and have the values 00, 01 and 11. Thus, as shown in FIG. 14, a second PNBA 78 is produced for all of the possible bit combinations which follow the sub-prefix 00, a third PNBA 80 is produced to encode all of the bit combinations which follow the sub-prefix 01, and a fourth PNBA 82 is produced to encode all of the bit combinations which follow the sub-prefix 11.

As shown in FIG. 10, for the second PNBA 78, the only bit combination which follows the 00 prefix is 10, which corresponds to bit position 5 of the two-bit PNBA shown in FIG. 11. Bit position five is thus set with a one and all other bit positions are set to zero. Consequently, as shown in FIG. 14, the second PNBA 78 has the value 000010.

As there is only one bit combination which follows the 00 prefix, there is only one record and the next hop information for the corresponding listed prefix, that is, for the listed prefix in row 3 of the table shown in FIG. 10 is appended to the bottom of the next hop array 72 to form a sixth position of that array, as shown in a second PNBA bit position field column 87 of the next hop array 72 shown in FIG. 13.

As shown in FIG. 14, a second next hop pointer 84 is associated with the second PNBA 78 to indicate the position, in the present example position 6, of the next hop array 72 at which next hop information for the first listed prefix encoded by the second PNBA 78 is stored.

As shown in FIG. 10, for the third PNBA 80, there are two combinations which follow the 01 sub-prefix: 0 and 1 respectively. These combinations correspond to the first and second bit positions of the two-bit PNBA shown in FIG. 11. Bit positions 1 and 2 of the third PNBA 80 are thus set to one and all other bit positions are set to zero. Consequently, as shown in FIG. 14 the third PNBA 80 has the value 110000.

As there are two combinations which follow the 01 sub-prefix, the corresponding listed strings are appended to the next hop array 72 shown in FIG. 13. Thus, the next hop information for the listed strings on rows 5 and 6 of the listed prefix table in FIG. 10 are appended to the next hop array 72 to occupy positions 7 and 8 of the next hop array as shown in a third PNBA bit position column 89 in FIG. 13.

As shown in FIG. 14 a third next hop pointer 86 is associated with the third PNBA 80 to indicate the address of the next hop array 72 at which next hop information for the first listed prefix encoded by the third PNBA 80 is stored.

As shown in FIG. 10, for the fourth PNBA 82, there is one combination which follows the 11 sub-prefix, and has a length of 2 or less and that is, 10, which correspond to bit positions 5 of the two-bit PNBA shown in FIG. 11. Bit positions five of the fourth PNBA is thus set to one and all other bit positions are set to zero. Consequently, as shown in FIG. 14, the fourth PNBA 82 has the value 000010.

Therefore the next hop information associated with only this one sub-prefix can be appended to the next hop array 72. Consequently, the next hop information from the listed prefix on row nine of the listed prefix table shown in FIG. 10 is appended to occupy position nine of the next hop array 72 as shown in the fourth PNBA bit position field column 91 in FIG. 13.

As shown in FIG. 14 a fourth next hop pointer 88 is associated with the fourth PNBA 82 to indicate the position of the next hop array 72 at which next hop information for the first listed prefix encoded by the fourth PNBA 82 is stored.

As shown in FIG. 14, second, third and fourth ESRBAs 90, 92 and 94 may also be associated with each of the second through fourth PNBAs, although in this embodiment, the ESRBAs for the second and third PNBAs contain all zeros because there are no further bits after those already encoded in some of the listed prefixes.

The fourth PNBA 82 has a non-zero fourth ESRBA 94 because, as shown in FIG. 10, the listed prefix shown in row 10 has at least one more bit, that is, it has a fifth bit whereas all of the other listed prefixes have four bits. Consequently, as shown in FIG. 14 the fourth ESRBA has the value 0001 and a fifth PNBA 96 is required to encode the fifth bit of the listed prefix in row 10 of the listed prefix table shown in FIG. 10. Following the procedure above, the fifth PNBA 96 must encode all of the possible k bit sequences following the bit combination 11 under the sub-prefix 11. The fifth PNBA 96 also has six bits, like all of the other PNBAs of this embodiment. Still referring to FIG. 10, the only bit combination following the bit combination 1111 is 1, which corresponds to the second bit position of the fifth PNBA 96. Consequently, as shown in FIG. 14 the fifth PNBA 96 has the value 010000.

As shown in FIG. 10, as there is only one bit combination which follows the 1111 bit combination, there is only one record and therefore the next hop information for the corresponding listed prefix, that is, the listed prefix in row 10 of the table is appended to the bottom of the next hop array 72 to form a tenth position of that array as shown in FIG. 13.

As shown in FIG. 14 a fifth next hop pointer 98 is associated with the fifth PNBA 96 to indicate the position of the next hop array 72 at which next hop information for the first listed prefix encoded by the fifth PNBA 96 is stored.

The fifth PNBA 96 may also have associated with it a fifth ESRBA 100, although in this example this ESRBA will have all zeros, i.e. 0000, since there are no further bits following the bit combination 11111.

As shown in FIG. 14, the first through fifth PNBAs and their associated ESRBAs and next hop pointers are best arranged into a search key 102 comprising first, second, third, fourth and fifth pages 102, 104, 106, 108 and 110 with directions for a second routing program to determine which page to address if further searching can be performed after a page has been considered. In general, any page having a non-zero ESRBA must have a next page pointer for this purpose. Thus the first page 103 has a next page pointer 111 pointing to the second page 104 to direct the routing program to the second page if further searching can be done after considering page one. The second and third pages, 104 and 106 each have no next page pointers as they already fully encode all listed bit combinations after their respective sub-prefixes 00 and 01. The fourth page 108 has a next page pointer 113 pointing to the fifth page, since the fourth page has a fourth ESRBA 94 indicating that more bits follow after the bit combination 1111 and since the fifth page represents the encoding of such bits under this bit combination. The fifth page has no next page pointer as the fifth PNBA on the fifth page fully encodes all listed prefixes after the bit combination 1111.

The search key 102 represents full encoding of the listed prefixes and is operable to be used by a routing program according to the second embodiment of the invention, to determine a next hop address for a packet received at the network element.

Locating and Routing According to the Second Embodiment

In this embodiment, like the first embodiment, the router code segment directs the processor circuit to use the destination address of a received packet to determine a longest matching listed prefix from the search key and to find the next hop information from the next hop array 72 using the PNBA bit position associated with the longest matching listed prefix.

More particularly, determining a longest matching listed prefix is achieved by first producing PNBA masks for each k or less bit combination in the destination address, using a procedure similar to that used to generate the PNBAs of the search key 102 shown in FIG. 14.

In particular, for each k-bit combination in the destination address a $(2^{k+1}-2)$-bit PNBA mask is generated wherein bit positions of the PNBA mask are set to 1 at position j according to the expression $$j = \sum_{i=1}^{|S_i|} 2^{i-1} + value(S_i), \qquad (5)$$

where:
$S_i$=one of the prefix substrings of the first, second, ... $n^{th}$ k-bit substring of the destination address;
$|S_i|$=the length of $S_i$, and
value($S_i$) is the decimal value of $S_i$.

In this embodiment, since the search key described above was generated with k=2, the PNBA masks should also be generated using k=2.

For example, if the destination address is 11101 it has three 2 or less bit combinations which are 11, 10 and 1.

The first set of two bits is 11 and therefore the second and sixth bit positions of a first PNBA mask produced according to the relation above, have ones, whereas the remaining bit positions have zeros, as shown in FIG. 16. This first PNBA mask is for searching the first page 103 of the search key 102.

The second set of two bits is 10 and therefore the second and fifth bit positions of a second PNBA mask 114 produced according to the relation above, have ones, whereas the remaining bit positions have zeros, as shown in FIG. 17. This second PNBA mask is for searching the next page indicated by the next page pointer 111 associated with the first page 103 shown in FIG. 14. Thus, in the embodiment shown, this second PNBA mask is for searching the second page 104 of the search key 102.

The third set of two bits is only one bit long and is the single bit 1. Therefore only the second bit position of a third PNBA mask 116 produced according to the relation above, has a one, whereas the remaining bit positions have zeros, as shown in FIG. 18. This third PNBA mask 116 is for searching the next page indicated by the next page pointer associated with the previous page. In general to avoid wasting computation time unused PNBA masks are not generated, in practice.

After producing the first, second and third PNBA masks shown in FIGS. 16–18, these masks are then compared against PNBAs of appropriate pages in the search key 102, the appropriate pages being determined as described below.

The first PNBA mask 112 shown in FIG. 16 is compared against the first PNBA 69 of the first page 103 shown in FIG. 14 by ANDing the first PNBA 69 and the first PNBA mask 112 together to produce a first resultant PNBA 118 as shown in FIG. 19.

In the first resultant PNBA 118 the bit position n associated with possible next hop information is the highest numbered bit position with a bit value of one. As shown in FIG. 19, in this embodiment that position is position 6. If no such bit position exists, then there is no next hop information in the next hop array and the packet is routed to a default port.

If the bit position located above is greater than or equal to 1, then the next hop information is given at a position in the next hop array 72 shown in FIG. 13 as determined by the following expression:

$$\sum_{i=1}^{n-1} PNBA(i) + value(\text{next hop pointer in the page}), \quad (6)$$

where

PNBA(i)=0 for i<1.

Using the above expression, with position 6 determined from FIG. 19.

n=6

$$\sum_{i=1}^{6-1} PNBA(i) = 4; \text{ and}$$

value(next hop pointer in the page)=1
4+1=5.

Consequently, possible next hop information is given in the fifth position of the next hop array 72 shown in FIG. 13. An index to this fifth position is stored for later use.

Before deciding to use the possible next hop information determined above as the actual next hop information, it is necessary to determine whether or not any longer matching listed prefix is encoded. To do this it is necessary to determine which page should be used next in looking for a longest match. To determine which page is to be used next, it is necessary to produce an ESRBA mask for each PNBA mask. In general, each ESRBA mask has $2^k$ bits with bits at positions p set to 1 according to the following expression:

$$p = \text{largest PNBA mask bit position} - 2^{k-1}, \quad (7)$$

In the present example k=2 and the largest PNBA mask bit position which is set to one in the first PNBA mask 112 shown in FIG. 16 is 6. Therefore as shown in FIG. 20 the fourth bit position of a first ESRBA mask 120 is set to one while all other bit positions are set to zero. Similarly, the largest PNBA mask bit position which is set to one in the second PNBA mask 114 shown in FIG. 17 is 5 and therefore as shown in FIG. 21 the third bit position of a second ESRBA mask 122 is set to one. Finally, the largest PNBA mask bit position which is set to one in the third PNBA mask 116 shown in FIG. 18 is 2 and therefore as shown in FIG. 22 no bits in a third ESRBA mask 124 are set to one, rather they are all set to zero.

After having produced the above ESRBA masks, the first ESRBA mask 120 shown in FIG. 20 is ANDed with the first ESRBA 76 of the first page 103 shown in FIG. 14. This produces a first resultant ESRBA 126 as shown in FIG. 23. Next it is necessary to locate the bit position m of the first resultant ESRBA 126 which has a one. If no such bit position exists, then there is no next page to continue the search and the search is terminated, in which case the pointer to the next hop information located above in connection with the first resultant PNBA 118 shown in FIG. 19 is used as the actual pointer to the next hop information. In this example, the next hop information associated with the fifth position in the next hop array 72 shown in FIG. 13 would be used.

If m≧1, then the next page p is given according to the following expression:

$$p = \sum_{i=1}^{m-1} ESRBA(i) + value(\text{next page pointer in the current page}), \quad (8)$$

where

ESRBA(i)=0 for i<1.

In the present example, the bit position in the first resultant ESRBA 126 shown in FIG. 23 which has a one is 4 and therefore m=4.

Using the above expression, m=4, $$\sum_{i=1}^{4-1} ESRBA(i) = 2; \text{ and}$$

value (next page pointer in the current page)=2
2+2=4.

Consequently, the next page to be considered is the fourth page 108 of the search key 102 shown in FIG. 14. Therefore the second PNBA mask 114 shown in FIG. 17 is to be ANDed with the fourth PNBA 82 shown in FIG. 14 to determine a second resultant PNBA 128 shown in FIG. 24.

In the second resultant PNBA 128 the bit position associated with possible next hop information is the highest numbered bit position with a bit value of one. As shown in FIG. 24, in this embodiment that position is position 5. If no such bit position exists, then the packet is routed to the port identified by the position determined in considering the first resultant PNBA, which in this embodiment would be the fifth position.

If the bit position is greater than or equal to 1, then the next hop information is given at a position in the next hop array determined by the following expression:

$$\sum_{i=1}^{n-1} PNBA(i) + value(\text{next hop pointer in the page}), \quad (9)$$

where

PNBA(i)=0 for i<1.

In this example, using the above expression, with position 5 (n=5), the entry in the next hop array 72 shown in FIG. 13 is given at the following location:

$$\sum_{i=1}^{5-1} PNBA(i) = 0; \text{ and}$$

value (next hop pointer in the page)=9
0+9=9.

Consequently, the ninth position in the next hop array is the next most possible position which holds the necessary next hop information, if no further searching is to be done.

To determine whether or not any further searching is to be done, it is necessary to determine whether or not there is a next page on which further searching can be performed. To find which page, if any with which to continue the search, the second ESRBA mask 122 shown in FIG. 21 is ANDed with the ESRBA associated with the current page under consideration. In this embodiment the current page under consideration is the fourth page 108, so the second ESRBA mask 122 is ANDed with the fourth ESRBA 94 shown in FIG. 14 and this produces a second resultant ESRBA 130 as shown in FIG. 25.

The next page on which to continue searching would be given by examining the second resultant ESRBA 130 to determine the bit position having a one and using the number of that position in expression (8) above for determining a next page. In the present example, the second resultant ESRBA 130 has all zeros and therefore, there are no further pages on which to continue the search. The search process is therefore terminated here and the next hop information stored at the ninth position of the next hop array 72 shown in FIG. 13 contains the next hop information corresponding to the longest matching prefix. The packet may then be routed to a port associated with next hop information specified by the ninth position of the next hop array. If no next hop entry location is found by the time the search process is completed, the packet is routed to the default port.

Encoding According to a Third Embodiment

Figure 26:
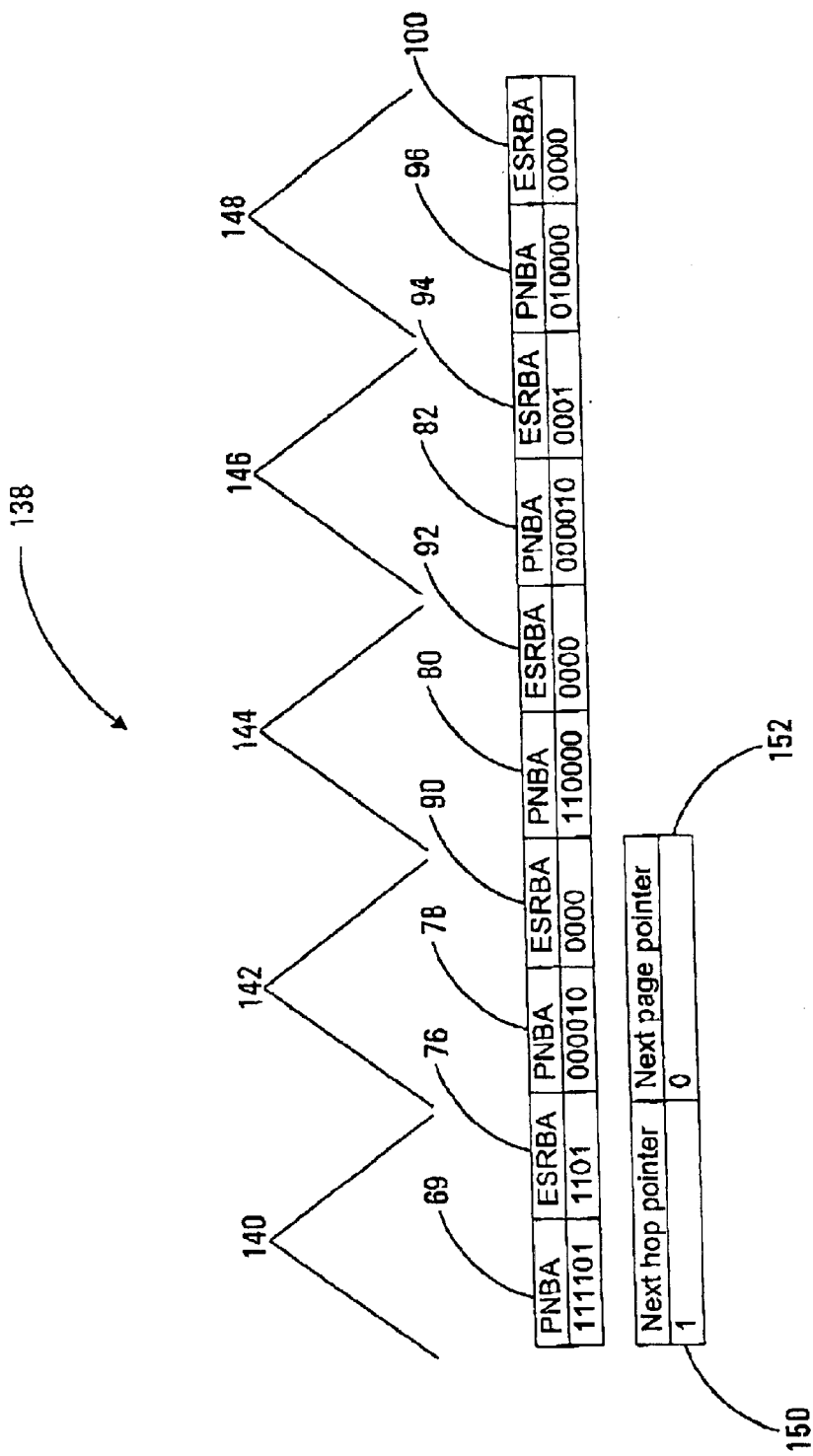
FIG. 26 is a tabular representation of a single page with five PNBA-ESRBA pairs in a search key produced according to the third embodiment of the invention.

Referring to FIG. 26, in accordance with a third embodiment of the invention, a search key comprising a single page, comprising first, second, third, fourth and fifth PNBA-ESRBA pairs 140, 142, 144, 146 and 148 is shown generally at 138. In this embodiment, the five PNBAs and ESRBAs comprising the PNBA-ESRBA pairs are the same as the first, second, third, fourth and fifth PNBAs 69, 78, 80, 82 and 96 and first, second, third, fourth and fifth ESRBAs 76, 90, 92, 94 and 100 of the second embodiment, and are produced in the same manner. They are merely listed differently, in a single page format. In addition, the generic page in this embodiment includes a next hop pointer 150 and a next page pointer 152. In generating successive PNBAs, the same next hop array as shown in FIG. 13 is also produced. Thus FIG. 13 represents the next hop array produced by either of the second or third embodiments.

Locating and Routing According to the Third Embodiment

In this embodiment, like the first and second embodiments, the router code segment directs the processor circuit 30 to use the destination address of a received packet to determine a longest matching listed prefix from the search key and to find the next hop information from the next hop array 72 using the PNBA bit position associated with the longest matching prefix.

More particularly, determining a longest matching listed prefix is achieved by first producing PNBA masks for each k or less bit combination in the destination address, using the procedure described above in connection with the second embodiment. Consequently, the same first, second and third PNBA masks 112, 114, and 116 shown in FIGS. 16, 17 and 18 respectively are produced.

The first PNBA mask 112 is ANDed with the first PNBA 69 in the single page shown in FIG. 26 to produce a first resultant PNBA 118 which is the same as the first resultant PNBA 118 generated in accordance with the second embodiment of the invention and shown in FIG. 19.

In the first resultant PNBA 118 the bit position associated with possible next hop information is the highest numbered bit position with a bit value of one. As shown in FIG. 19, that position is position 6. If no such bit position, n, exists in the resultant PNBA, then there is no next hop information in the next hop array.

If n≧1, then the location of the next hop information in the next hop array 72 shown in FIG. 13 is given by the following expression:

$$\sum_{j=1}^{i=1} \sum_{i=1}^{|PNBA_j|} PNBA_j(i) + \sum_{i=1}^{n-1} PNBA_i(i) + \quad (10)$$

$$value(\text{next hop pointer in the page}),$$

where $PNBA_t(i)=0$ for i<1 or t<0;

|PNBA| is the length of the PNBA string; and $PNBA_t$ is the $t^{th}$ PNBA in the page and the current PNBA being examined.

In this example there are five PNBA-ESRBA pairs. Using expression (10) above, $$\sum_{j=1}^{0} \sum_{i=1}^{|PNBA_j|} PNBA_j(i) = 0; \text{ and } \sum_{i=1}^{6-1} PNBA_i(i) = 4; \text{ and}$$

value (next hop ptr in the page)=1
0+4+1=5.

Consequently, possible next hop information is given in the fifth position of the next hop array 72 shown in FIG. 13.

Before deciding to use the possible next hop information determined above as actual next hop information, it is necessary to determine whether or not any longer matching listed prefix is encoded. To do this it is necessary to determine which PNBA-ESRBA pair in the current page or some other page if there is one, should be used next in looking for a longest match. To determine which PNBA-ESRBA pair is to be used next, it is necessary to produce an ESRBA mask for each PNBA mask. In general, each ESRBA mask has $2^k$ bits with bits at positions p set to 1 according to the following expression:

$$p = \text{largest PNBA mask bit position} - 2^{k-1}, \quad (11)$$

The three PNBA masks are shown at 112, 114 and 116 respectively in FIGS. 16, 17 and 18 respectively. In the present example k=2 and the largest PNBA mask bit position which is set to one in the first PNBA mask 112 shown in FIG. 16 is 6. Therefore as shown in FIG. 20 the fourth bit position of the first ESRBA mask 120 is set to one while all other bit positions are set to zero. Similarly, the largest PNBA mask bit position which is set to one in the second PNBA mask 114 shown in FIG. 17 is 5 and therefore as shown in FIG. 21 the third bit position of the second ESRBA mask 122 is set to zero. Finally, the largest PNBA mask bit position which is set to one in the third PNBA mask 116 shown in FIG. 18 is 2 and therefore as shown in FIG. 22 no bits in the third ESRBA MASK 124 shown in FIG. 22 are set to one, rather they are all set to zero.

After having produced the above three ESRBA masks, the first ESRBA mask 120 shown in FIG. 20 is ANDed with the first ESRBA 76 of the first PNBA-ESRBA pair 140 shown in FIG. 26. This produces a first resultant ESRBA 126 as shown in FIG. 23. Next it is necessary to locate the bit position m of the first resultant ESRBA 126 which has a one. If no such bit position, m, exists, then there is no next page to continue the search and the search is terminated, in which case the pointer to the next hop information located above in connection with the first resultant PNBA shown in FIG. 19 is used as the actual pointer to the next hop information.

If $m \geq 1$, then the next PNBA-ESRBA pair to consider is an entry in the current page or in another page as given by the following expression:

$$r = \sum_{j=1}^{t-1} \sum_{i=1}^{|ESRBA_j|} ESRBA_j(i) + \sum_{i=1}^{m} ESRBA_i(i) + 1, \quad (12)$$

where:

$ESRBA_t(i)=0$ for i<1 or t<0,

|ESRBA| is the length of the ESRBA string, $ESRBA_t$ is the $t^{th}$ ESRBA in a page and the current ESRBA being examined; and u is the number of PNBA-ESRBA pairs stored in a page. In this example there are five PNBA-ESRBA pairs.

Using the above expression in the present example:

$$r = \sum_{j=1}^{0} \sum_{i=1}^{|ESRBA_j|} ESRBA_j(i) = 0; \text{ and } \sum_{i=1}^{6} ESRBA_i(i) = 3$$

0+3+1=4.

Note that $r=4 \leq u=5$. Consequently, the fourth PNBA-ESRBA pair of the current page is the next PNBA-ESRBA pair to be considered.

If r>U, then the next PNBA-ESRBA pair is determined (according to the relation v=(r-1) mod u+1 and this remainder identifies the PNBA-ESRBA pair of another page identified according to the following expression:

$$\text{Next page} = \text{next page pointer in current page} + \left\lfloor \frac{r}{u} \right\rfloor. \quad (13)$$

In the present example, to this point the next PNBA-ESRBA pair in the present page has been identified as the fourth PNBA-ESRBA pair 146 shown in FIG. 26. The fourth PNBA 82 of this fourth PNBA-ESRBA pair 146 is then ANDed with the second PNBA mask 114 shown in FIG. 17 to produce the second resultant PNBA 128 as shown in FIG. 24.

In the second resultant PNBA 128 the bit position associated with possible next hop information is the highest numbered bit position with a bit value of one. As shown in FIG. 24, in this embodiment that position is position 5. If no such bit position exists, then the packet is routed to the location determined above as provided by evaluation of expression (10) above, which was found to be the fifth position of the next hop array 72, in this embodiment.

If the bit position located above is greater than or equal to 1, then the next hop information is given at a position in the next hop array 72 shown in FIG. 13 determined by the following expression:

$$\sum_{j=1}^{i-1} \sum_{i=1}^{|PNBA_j|} PNBA_j(i) + \sum_{i=1}^{n-1} PNBA_i(i) + \quad (14)$$

$value$(next hop pointer in the page), where $PNBA_t(i)=0$ for i<1 or t<0 and

|PNBA| is the length of the PNBA string.

Using the above expression in the present example:

$$\sum_{j=1}^{3} \sum_{i=1}^{|PNBA_j|} PNBA_j(i) = 8; \text{ and } \sum_{i=1}^{5-1} PNBA_4(i) = 0; \text{ and}$$

value (next hop pointer in the page)=1

8+0+1=9.

Consequently, the ninth position of the next hop array is the next most possible position of the next hop array 72 which holds the necessary next hop information, if no further searching is to be done.

To determine whether or not any further searching is to be done, it is necessary to determine whether or not there is a next PNBA-ESRBA pair on the same page or on another page on which further searching can be performed. To find which pair, if any on which to continue the search, the second ESRBA mask 122 shown in FIG. 21 is ANDed with the ESRBA associated with the PNBA-ESRBA pair under current consideration. In this embodiment the current PNBA-ESRBA pair under consideration is the fourth pair 146 so the second ESRBA mask 122 is ANDed with the fourth ESRBA 94 and this produces the second resultant ESRBA 130 shown in FIG. 25.

The next pair on which to continue searching would be given by examining the second resultant ESRBA 130 to determine the bit position having a one and using the number of that position in expression (12) above for determining a next pair. In the present example, the second resultant ESRBA 130 has all zeros and therefore, there are no further PNBA-ESRBA pairs on which to search. The search process is therefore terminated here and the next hop information stored at the ninth position of the next hop array 72 shown in FIG. 13 contains the next hop information corresponding to the longest matching prefix. The packet may then be routed to a port associated with next hop information specified by the ninth position of the next hop array. If no next hop array position is found by the time the search process is completed, the packet is routed to a default port.

While specific embodiments of the invention have been described and illustrated, such embodiments should be considered illustrative of the invention only and not as limiting the invention as construed in accordance with the accompanying claims.

What is claimed is:

1. A method of encoding a plurality of predefined codes into a search key, the method comprising:
 a) producing a Prefix Node Bit Array (PNBA) having a plurality of bit positions corresponding to possible bit combinations of a bit string having a length equal to or less than the longest predefined code in said plurality of said pre-defined codes such that said bit positions are arranged by the lengths of said possible bit combinations and by numeric value of said possible bit combinations; and
 b) setting bits active in bit positions which correspond to bit combinations of said possible bit combinations identified by said pre-defined codes.

2. The method claimed in claim 1 wherein producing comprises arranging said bit positions in order by ascending lengths of corresponding said possible bit combinations.

3. The method claimed in claim 2 wherein producing comprises further arranging said bit positions in order by ascending numeric value of corresponding said possible bit combinations.

4. The method claimed in claim 1 further comprising producing a next hop array associating bit positions of said PNBA which have active bits with routing information for use by a router to route a packet.

5. The method claimed in claim 1 wherein producing comprises producing a plurality of PNBAs, each PNBA corresponding to a sub-group of bits of said pre-defined codes.

6. The method claimed in claim 5 further comprising producing an External Subtree Root Bit Array (ESRBA) for each PNBA, said ESRBA having bit positions corresponding to possible further subgroups of bits of said pre-defined codes.

7. The method claimed in claim 6 further comprising producing a plurality of pages, each page comprising a plurality of PNBA-ESRBA pairs.

8. The method claimed in claim 6 further comprising producing a next hop array associating bit positions of said PNBA which have active bits with routing information for use by a router to route a packet.

9. The method claimed in claim 8 further comprising associating with each of said PNBAs a next hop pointer pointing to a position in said next hop array at which next hop information associated with a first active bit of said PNBA is located.

10. The method claimed in claim 9 further comprising arranging said plurality of PNBAs into a plurality of respective pages, each page comprising a PNBA, an associated ESRBA, an associated next hop pointer and a next page pointer pointing to a next page in said plurality of respective pages to be searched.

11. An apparatus for encoding a plurality of predefined codes into a search key, the apparatus comprising:
 a) means for producing a Prefix Node Bit Array (PNBA) having a plurality of bit positions corresponding to possible bit combinations of a bit string having a length equal to or less than the longest predefined code in said plurality of said pre-defined codes such that said bit positions are arranged by the lengths of said possible bit combinations and by numeric value of said bit combinations; and
 b) means for setting bits active in bit positions which correspond to bit combinations of said possible bit combinations identified by said pre-defined codes.

12. An apparatus for encoding a plurality of predefined codes into a search key, the apparatus comprising a processor circuit and memory in communication with the processor circuit, said memory being configured to direct the processor circuit to:
 a) produce a Prefix Node Bit Array (PNBA) having a plurality of bit positions corresponding to possible bit combinations of a bit string having a length equal to or less than the longest predefined code in said plurality of said pre-defined codes such that said bit positions are arranged by the lengths of said possible bit combinations and by numeric value of said bit combinations, and
 b) set bits active in bit positions which correspond to bit combinations of said possible bit combinations identified by said pre-defined codes.

13. The apparatus claimed in claim 12 wherein said memory processor is configured to direct said processor circuit to arrange said bit positions in order by ascending lengths of corresponding said possible bit combinations.

14. The apparatus claimed in claim 13 wherein said memory processor is configured to direct said processor circuit to further arrange said bit positions in order by ascending numeric value of corresponding said possible bit combinations.

15. The apparatus claimed in claim 12 wherein said memory processor is configured to direct said processor circuit to produce a next hop array associating bit positions of said PNBA which have active bits with routing information for use by a router to route a packet.

16. The apparatus claimed in claim 12 wherein said memory processor is configured to direct said processor circuit to produce a plurality of PNBAs, each PNBA corresponding to a sub-group of bits of said pre-defined codes.

17. The apparatus claimed in claim 16 wherein said memory processor is configured to direct said processor circuit to produce an External Subtree Root Bit Array (ESRBA) for each PNBA, said ESRBA having bit positions corresponding to possible further subgroups of bits of said pre-defined codes.

18. The apparatus claimed in claim 17 wherein said memory processor is configured to direct said processor circuit to produce a plurality of pages, each page comprising a plurality of PNBA-ESRBA pairs.

19. The apparatus claimed in claim 17 wherein said memory processor is configured to direct said processor circuit to produce a next hop array associating bit positions of said PNBA which have active bits with routing information for use by a router to route a packet.

20. The apparatus claimed in claim 19 wherein said memory processor is configured to direct said processor circuit to associate with each of said PNBAs a next hop pointer pointing to a position in said next hop array at which next hop information associated with a first active bit of said PNBA is located.

21. The apparatus claimed in claim 20 wherein said memory processor is configured to direct said processor circuit to arrange said plurality of PNBAs into a plurality of respective pages, each page comprising a PNBA, an associated ESRBA, an associated next hop pointer and a next page pointer pointing to a next page in said plurality of respective pages to be searched.

22. A computer readable medium encoded with codes for directing a processor circuit to carry out the steps recited in claim 1.

23. A computer readable signal encoded with codes for directing a processor circuit to carry out the steps recited in claim 1.

* * * * *